US005664604A

United States Patent [19]
Sato et al.

[11] Patent Number: 5,664,604
[45] Date of Patent: Sep. 9, 1997

[54] POWER FEEDING SYSTEM FOR SOLENOID VALVE ASSEMBLY

[75] Inventors: Hideharu Sato; Makoto Ishikawa, both of Yawara-mura, Japan

[73] Assignee: SMC Corporation, Tokyo, Japan

[21] Appl. No.: 360,369

[22] Filed: Dec. 21, 1994

[30] Foreign Application Priority Data

Dec. 21, 1993 [JP] Japan ............................ 5-073127 U

[51] Int. Cl.$^{6}$ ............................ F16K 31/04

[52] U.S. Cl. ............................ 137/884; 137/596.16

[58] Field of Search ............................ 137/596.16, 596.17, 137/596.18, 884

[56] References Cited

U.S. PATENT DOCUMENTS

| | | | |
|---|---|---|---|
| 4,815,496 | 3/1989 | Nishitani et al. | 137/884 |
| 4,938,258 | 7/1990 | Sato | 137/884 |
| 5,180,318 | 1/1993 | Möller et al. | 137/884 X |
| 5,348,047 | 9/1994 | Stoll et al. | 137/884 X |

FOREIGN PATENT DOCUMENTS

| | | |
|---|---|---|
| 0 493 972 | 7/1992 | European Pat. Off. . |
| 38 19 761 | 12/1989 | Germany . |
| 40 37 353 | 3/1992 | Germany . |
| 92 14 301 | 2/1993 | Germany . |
| 2 163 815 | 3/1986 | United Kingdom . |

*Primary Examiner*—John C. Fox
*Attorney, Agent, or Firm*—Oblon, Spivak, McClelland, Maier & Neustadt, P.C.

[57] ABSTRACT

The present invention is to provide a power feeding system for a solenoid valve assembly, by which it is possible to achieve direct power feeding to the solenoid valve and also power feeding through manifold bases. On one end of the manifold base 1, a wiring box 29 having a power feeding terminal 33 is mounted. A solenoid terminal 25 is provided, and which can achieve direct power feeding to the solenoid. A relay socket 36, having a relay terminal 51 is provided for connecting the solenoid terminal 25 with the power feeding terminal 33. As a result, when the solenoid valve 2 is installed on the manifold base 1, channels for the pressure fluid are communicated with each other, and the relay terminal is connected with the power feeding terminal, thus enabling power feeding through the manifold bases.

4 Claims, 7 Drawing Sheets

POWER FEEDING SYSTEM FOR SOLENOID VALVE ASSEMBLY

BACKGROUND OF THE INVENTION

The present invention relates to a power feeding system for a solenoid valve assembly, which comprises solenoid valves attached on manifold bases, to selectively achieve direct power feeding to the solenoid valves and power feeding via the manifold bases.

DESCRIPTION OF PRIOR ART

A solenoid valve assembly is already known, which comprises manifold bases corresponding to the number of solenoid valves required and solenoid valves attached on the manifold bases, whereby a supply opening, discharge opening, an output opening, a pilot supply opening, and a pilot discharge opening for compressed air are provided in a solenoid valve mounting surface on each of the manifold bases. A port communicated with each of the above openings of the manifold bases is formed on each of the solenoid valves, and a power feeding terminal to the solenoid is provided. The openings and the ports are individually communicated with each other when the solenoid valves are installed on the manifold bases.

There are two modes of power feeding to the solenoid valves in this type of solenoid valve assembly: a mode to supply power by connecting a socket directly to solenoid terminal of each solenoid valve, and a mode to supply power through the manifold bases. These modes are selected, depending upon the requirements of the users and the site of installation of the solenoid valve assembly.

For this reason, two types each of manifold base and solenoid valve must be furnished in the solenoid valve assembly as described above, i.e. those used when an individual power feeding socket is directly connected to the solenoid valve and those used when power feeding terminals are connected together via the manifold bases. When these components are individually produced, the manifold bases and the solenoid valves must be manufactured in small quantity and in different types. This leads to the increase of production cost and to more complicated product control.

In this respect, there are strong demands on the production of a valve, which has the components for common use.

SUMMARY OF THE INVENTION

It is an object of the present invention to provide a solenoid valve assembly, which comprises manifold bases and solenoid valves for common use and by which it is possible to achieve direct power feeding to the solenoid valves and also power feeding through the manifold bases, whereby there is no need to prepare manifold bases and solenoid valves for different power feeding modes. As a result the number of the types of components can be reduced and the solenoid valve assembly can be produced at lower cost, thus facilitating production of the solenoid valve assembly at lower cost and providing easier control for components and parts.

To attain the above object, the power feeding system for a solenoid valve assembly according to the present invention comprises manifold bases, each having a plurality of openings on a mounting surface thereof for supplying and discharging pressure fluid to and from a solenoid valve, and solenoid valves, each having a plurality of ports to be connected to said openings the mounting surface of said manifold base. The ports are used for switching over channels between ports by operation of a solenoid. The openings and the ports are communicated with each other when the solenoid valve is installed on the manifold base. A solenoid terminal for supplying power to the solenoid is provided on one end surface of the solenoid valve. A socket for power feeding can be directly connected the solenoid terminal from an outside source wiring box having a power feeding terminal connected to a power source on the upper surface thereof is removably mounted on one end surface of the manifold base. A relay socket having a conductive fixture to be electrically connected with the solenoid terminal is removably mounted on the solenoid of the solenoid valve. Power feeding pins for electrically connecting the conductive fixture to the power feeding terminal of the wiring box, protruding toward said power feeding terminal, are mounted on the relay socket when the solenoid valve is installed on the manifold base.

In a solenoid valve assembly with the above arrangement, when the wiring box is mounted on the manifold base, the relay socket is mounted on the solenoid terminal of the solenoid valve, and the solenoid valve is installed on the manifold base, each of the openings of the manifold base and each of the ports of the solenoid valve are communicated with each other. At the time, the power feeding terminal of the wiring box is electrically connected with the solenoid terminal of the solenoid valve by the relay terminal of the relay socket, and this makes it possible to feed power to the solenoid valve through the manifold base.

In case the power is directly supplied to the solenoid from outside, the solenoid valve, after removing the relay socket, may be installed on the manifold base, after removing the wiring box from it. As a result, each of a plurality of openings of the manifold base is communicated with each of a plurality of ports on the solenoid valve. When the power feeding socket is connected to the solenoid terminal of the solenoid valve, it is possible to directly supply power to the solenoid valve.

Therefore, it is possible to achieve direct power feeding to the solenoid valve, or power feeding to the solenoid valve through the manifold base. This leads to a reduction of the number of types of components thereby reducing the manufacturing cost for the solenoid valve assembly and facilitating control of components and parts.

DETAILED DESCRIPTION OF THE PREFERRED EMBODIMENTS

FIG. 1 to FIG. 6 each represents a first embodiment of a solenoid valve assembly provided with a power feeding system of the present invention. In this embodiment, a manifold base 1 has a recess on the lower surface thereof engaged with a rail (not shown), so that as many manifold bases 1 as desired can be arranged together. On the mounting surface of each of the manifold bases 1, each of solenoid valves 2 is installed.

Figure 1:
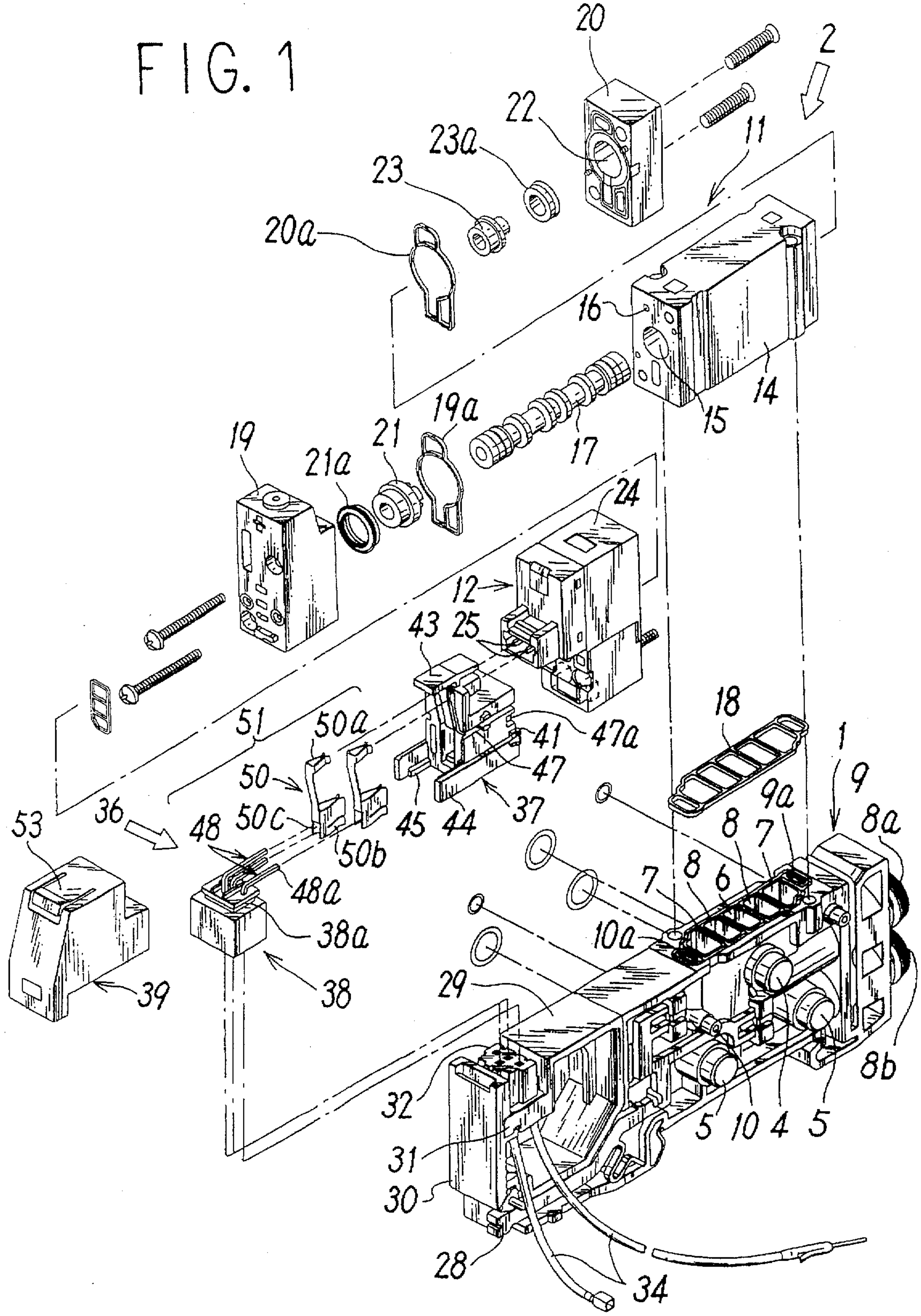
FIG. 1 is an exploded perspective view showing an arrangement of a set of a manifold base and solenoid valve in a first embodiment of a Solenoid valve assembly provided with a power feeding system of the present invention.

As shown in FIG. 1, each of the manifold bases 1 is provided with a supply channel 4, a plurality of discharge channels 5, a pilot supply channel 9 and a pilot discharge channel 10 for pressure fluid, each communicated with its counterpart when the manifold bases are serially arranged on the rail. On one end surface of the manifold, running perpendicularly to the installed plane, output ports 8*a* and 8*b* are formed. Further, on mounting surface of each of the solenoid valves 2, output openings 8 communicated with the outputs ports 8*a* and 8*b*, pilot supply openings 9*a* communicated with the pilot supply channel 9, and pilot discharge openings 10*a* communicated with the pilot discharge channel 10 are provided.

The solenoid valve 2 comprises a main valve 11 and a solenoid-driven pilot valve 12 for driving the main valve.

A valve main unit 14 of the main valve 11 has a supply port, an output port, a discharge port, a pilot supply port and a pilot discharge port (not shown) for pressure fluid, each corresponding to each opening on the manifold base 1 and provided on the mounting surface of the manifold base 1. It is further provided with an axial valve hole 15 communicated with these ports and an axial pilot channel 16 communicated with the pilot supply opening. When the solenoid valve 2 is installed on the mounting surface of the manifold base 1 via a gasket 18, these ports and the pilot supply and discharge openings are communicated with each of the corresponding openings. On the valve hole 15, a spool valve disc 17 for switching the channel is slidably inserted.

Figure 8:
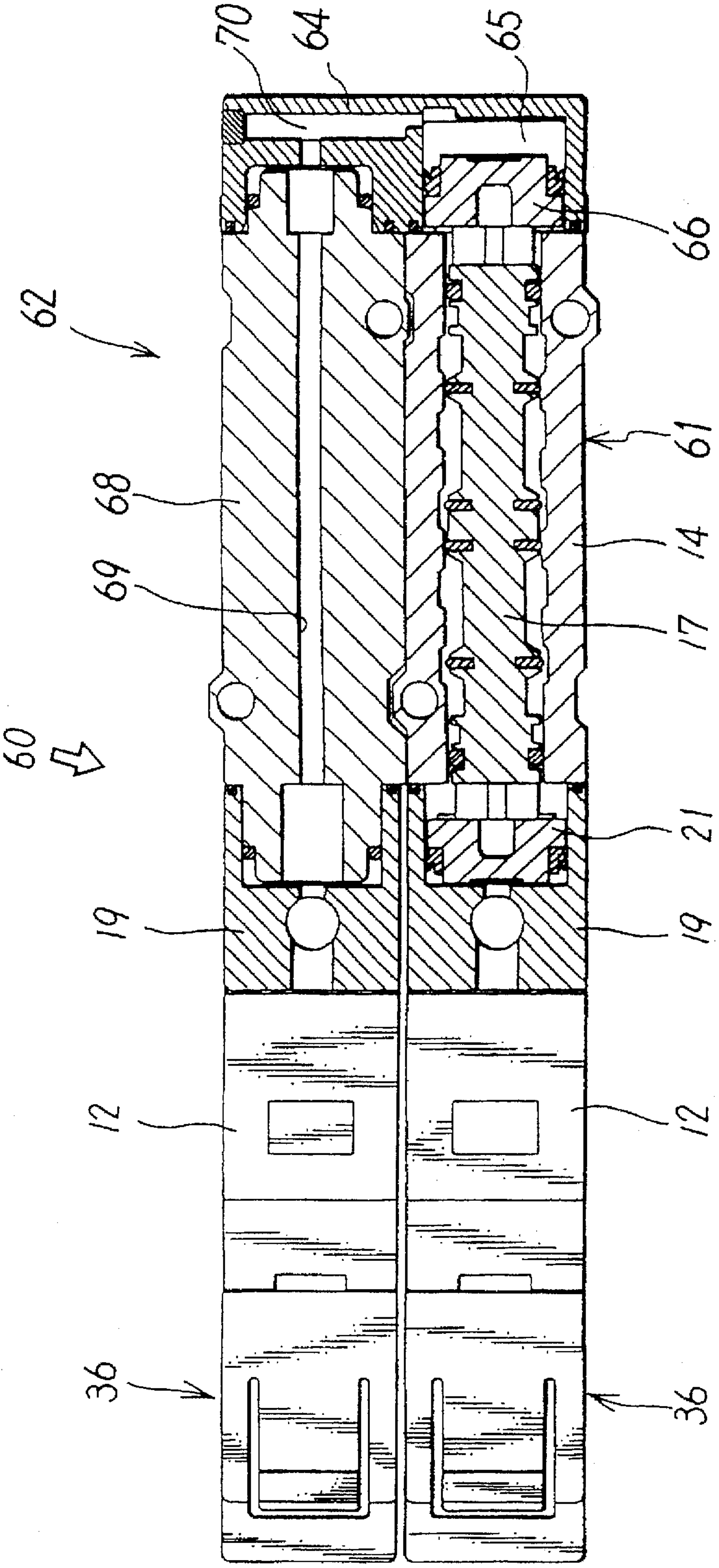
FIG. 8 is a cross-sectional view of an essential portion of the above embodiment.

A piston box 19 is mounted on one end surface of the valve main unit 14, and an end plate 20 is mounted on the other end surface thereof. The piston box 19 and end plate 20 are mounted via sealing members 19*a* and 20*a*, respectively using mounting screws. In the piston box 19, a cylinder chamber having a diameter larger than the valve hole 15 and communicated with the valve hole 15 is provided along a line coaxial with the valve hole 15 of the valve main unit 14 as shown in FIG. 8. In this cylinder chamber, a driving piston 21 having a diameter larger than the valve disc 17 and contacting an end of the valve disc 17 is slidably placed via a sealing member 21*a*. On the other hand, in the end plate 20, a return chamber 22 communicated with the valve hole 15 and positioned along a line coaxial with the valve hole 15 of the valve main unit 14 is provided. In the return chamber 22, a return piston 23 having a diameter approximately equal to that of the valve disc 17 of the main valve 11 and contacting the valve disc 17 is slidably inserted via a sealing member 23*a*. The return chamber 22 behind the return piston 23 is communicated with the pilot supply opening 9*a* of the manifold base 1 and with the pilot channel 16 in the valve main unit 14.

The pilot valve 12 mounted on one end surface of the piston box 19 serves as a 3-port solenoid valve of known type, which switches over the communication of the pilot output port with the pilot supply port or the pilot discharge port (not shown) by exciting or releasing a solenoid 14. The pilot output port is communicated with the cylinder chamber of the piston box 19, and the pilot supply port is communicated with the pilot supply opening 9*a* via a channel of the piston box and the pilot channel 16. The pilot discharge port is communicated with the pilot discharge opening 10*a*.

Therefore, when the solenoid valve 24 of the pilot valve 12 is excited in the solenoid 2, pilot fluid is supplied from the pilot output port to the cylinder chamber in the piston box 19. Against operating force of fluid pressure, which exerts action on the return chamber 22 having a diameter larger than the piston 21, the valve disc 17 of the main valve 11 is moved, and one of the supply port and the output port or the other of the output port and the supply port is communicated with one of the output ports, and the other of the output ports is communicated with the discharge port. When the solenoid 24 is demagnetized, the pilot fluid in the clyinder chamber is discharged from the pilot discharge port. Thus, by the operating force of fluid pressure, which exerts action on the return piston 23 in the return chamber 22, the valve disc 17 is slid in reverse direction and is set to another switching position. As a result, the supply port is communicated with the other output port, and the output port previously communicated with the supply port is communicated with the discharge port.

Figure 2:
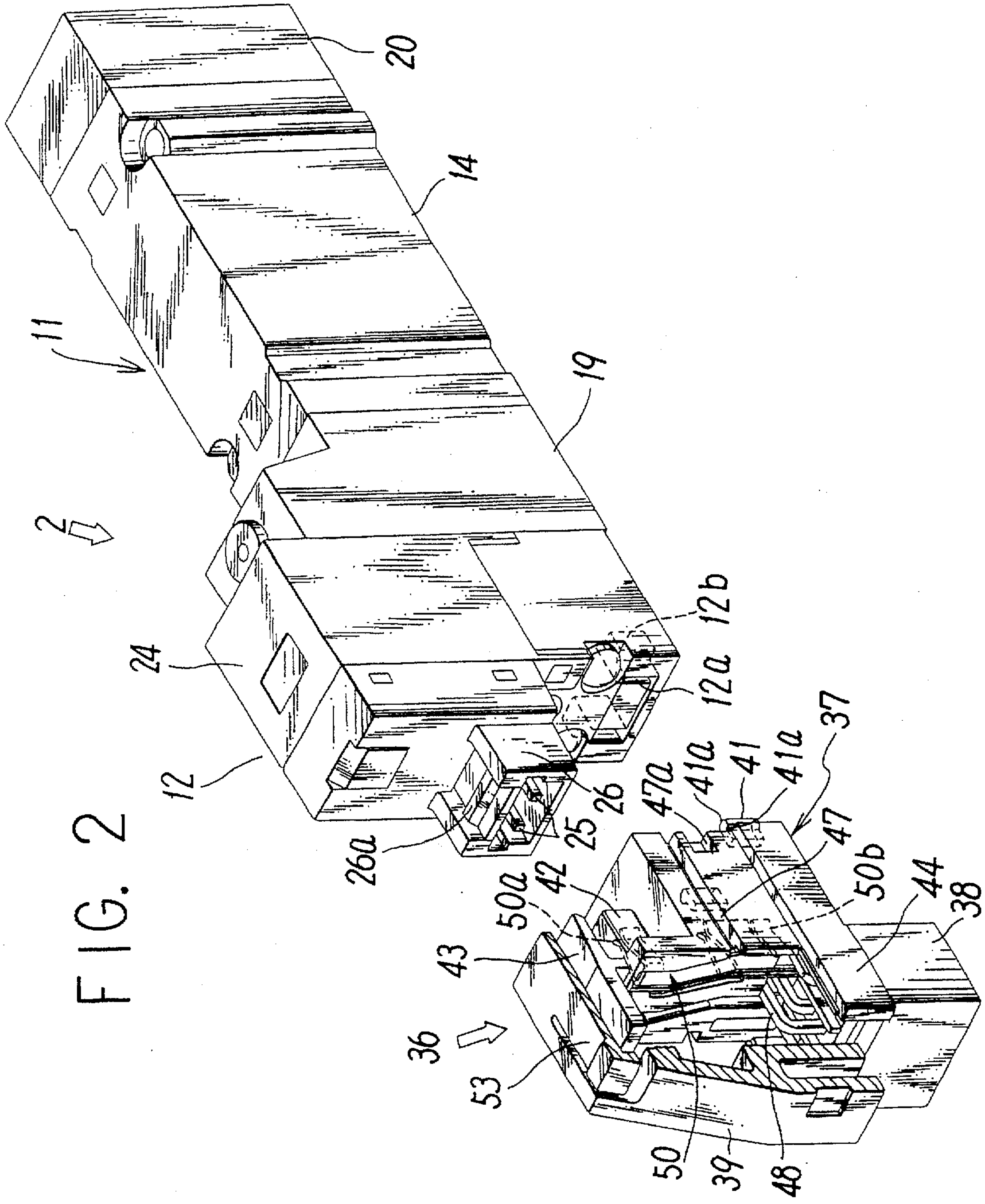
FIG. 2 is a partially cutaway perspective view of a solenoid valve and a wiring box in assembled state in the above embodiment.

As shown in FIG. 2 in detail, a solenoid terminal 25 for power feeding in a solenoid 24 protrudes from the solenoid 14 toward the opposite direction from the main valve 11 and is surrounded by a protective wall 26 provided on the case of the solenoid 24. To the solenoid terminal 25, a power feeding socket from outside can be directly connected.

Figure 3:
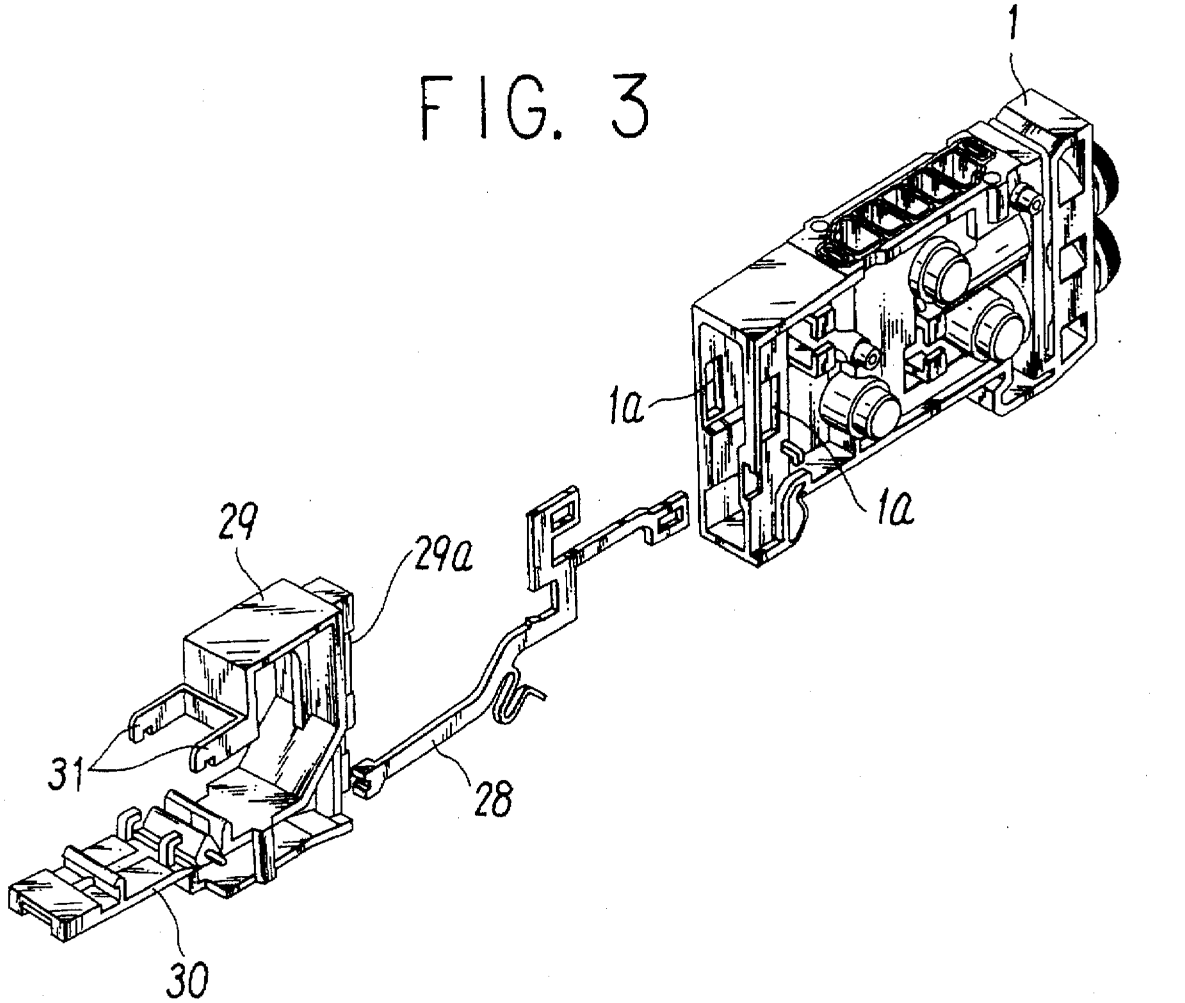
FIG. 3 is an exploded perspective view showing an arrangement of an essential portion of a power feeding box and the manifold base in the above embodiment.

A lever 28 as shown in FIG. 1 and FIG. 3 is used to connect the manifold bases 1 with each other when the manifold bases 1 adjacent to each other are arranged with a recess on the lower surface of each manifold base and engaged with the rail. The coupling mechanism of the manifold bases by the lever 28 has been disclosed by the present inventors in Japanese Utility Model Laid-Open Publication 3-44205, and therefore a detailed description is not given here.

Figure 4:
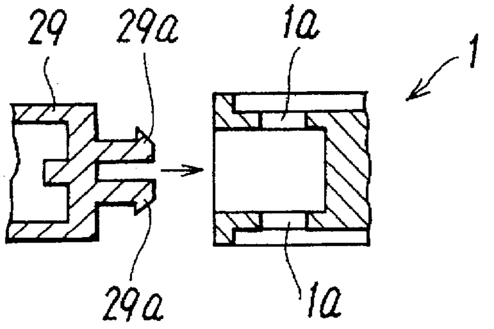
FIG. 4 is a cross-sectional view showing the mounting condition of the power feeding box with respect to the manifold base.

As shown in FIG. 3 and FIG. 4, a wiring box 29 is removably mounted on one end surface of the manifold base 1 by elastically engaging a pair of pawls 29*a* with a pair of engagement holes 1*a* on left and right walls of the manifold base 1.

Figure 6:
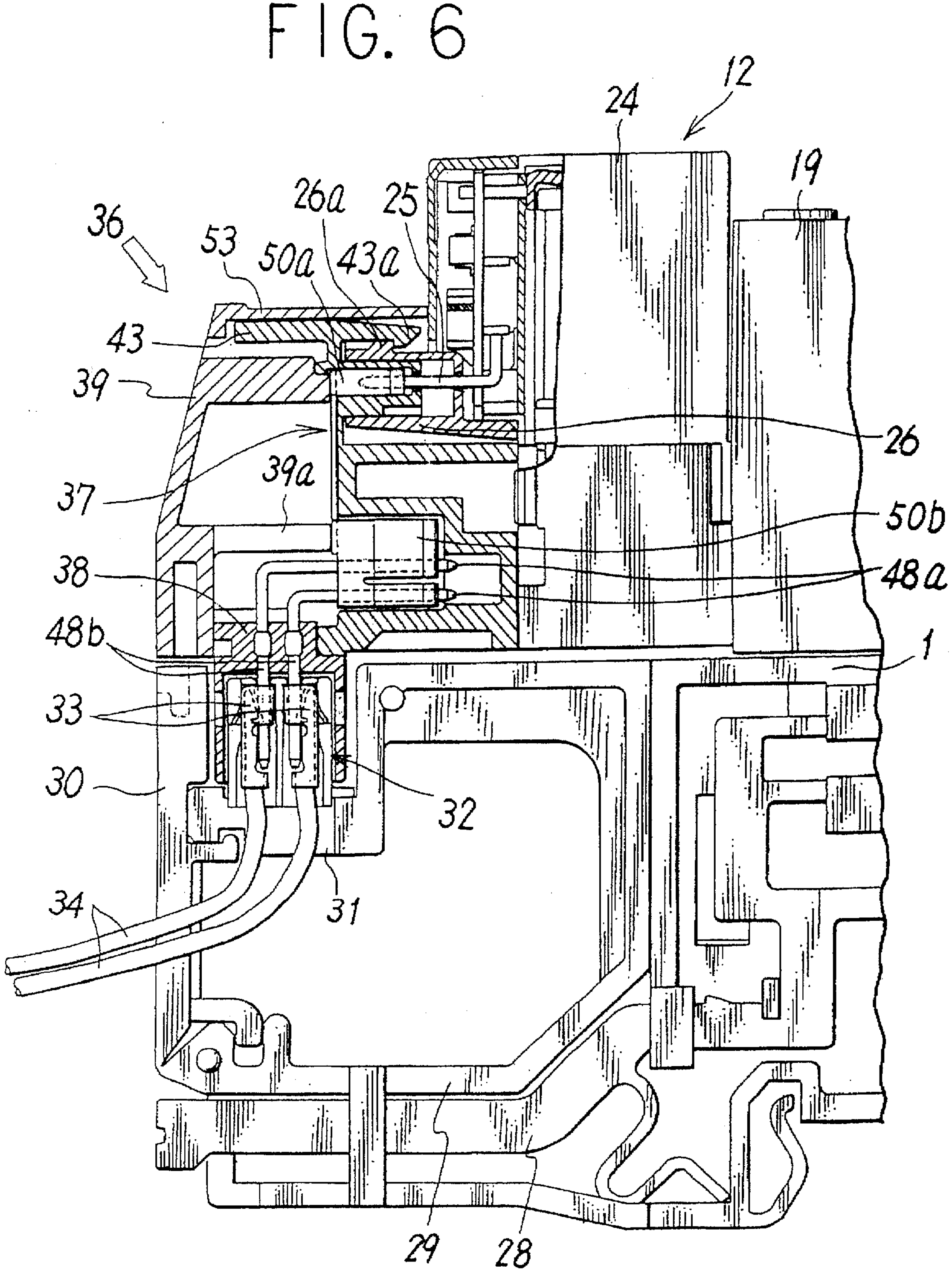
FIG. 6 is an enlarged view of an arrangement where a relay socket is connected to a solenoid terminal of the manifold base.

As shown in FIGS. 1, 3 and 6 in detail, the wiring box 29 mounted on the manifold base 1 has its left and right sides open and is provided with a cover 30 to be opened or closed on the outer end surface. In a space between a pair of locking arms 31 engaged with the left and right ends of the cover 30 and opened when the cover is opened, a power feeding socket 32 is tightly mounted. A power feeding terminal 33 of the power feeding socket 32 is connected to a power source via a lead wire 34, which is sequentially guided to the end through the wiring box 29 of the adjacent manifold base 1.

A relay socket 36 for feeding power to the solenoid terminal 25 comprises a socket main unit 37 mounted on the pilot valve 12, a connector 38 to be mounted on the socket main unit 37, and a cover 39 for enclosing these components.

Figure 5:
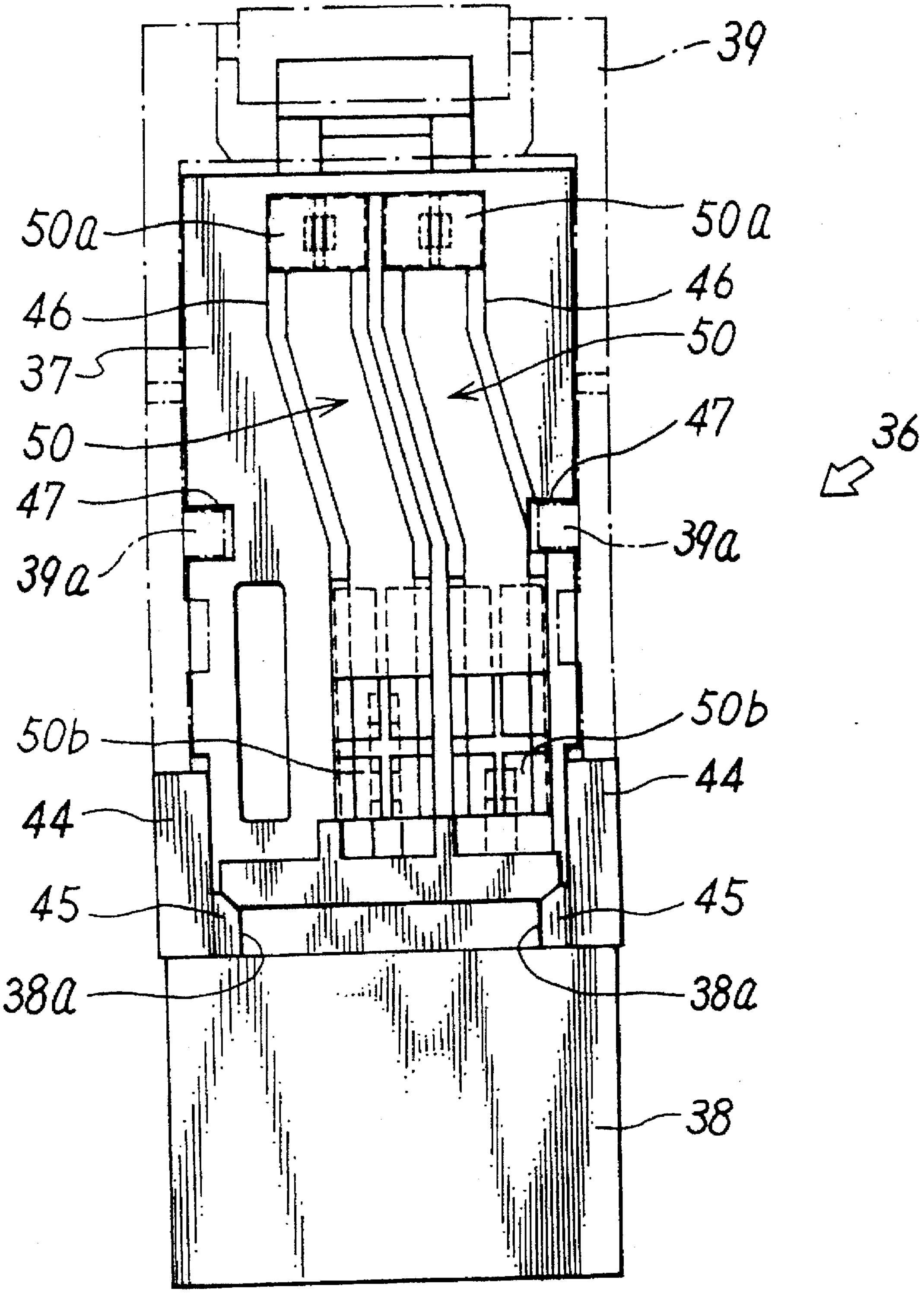
FIG. 5 is a front view of a relay socket in the above power feeding box.

As it is evident from FIG. 2, a locking ridge 41 inserted into the recess 12*a* of the pilot valve 12 and engaged with a pair of left and right locking recesses 12*b* below the solenoid valve 2 is integrally provided on the socket main unit 37. On forward and rear ends of each of the locking ridges, inclined sectors 41*a* and 41*a* to facilitate engagement and release of the locking ridges 41 with respect to the locking recesses 12*b* are formed. On the socket main unit 37, a hollow insert 42 is integrally provided, which is inserted into the protective wall 26 of the solenoid 24. Upon the insertion of the hollow insert 42, a moving piece 43 having a locking member 43*a* (FIG. 6) to be engaged with the locking ridge 26*a* on upper surface of the protective wall 26 is movably coupled. Further, on the socket main unit 37, an engaging member 45 is provided inside each of the left and right support plates 44. A pair of left and right engaging grooves 38*a* are provided in connecting member 38 to receive the respective engaging members 45 (FIG. 1 and FIG. 5).

The connecting member 38 has a plurality of power feeding pins 48, each of which comprises a horizontal sector 48*a* and a vertical sector 48*b* as it is bent in inverted L-shape. The horizontal sector 48*a* is protruded so that it can be forcibly placed into a conductive fixture 50 placed in two grooves (FIG. 5) provided in parallel on the socket main unit 37. The vertical sector 48*b* is arranged in such manner that inner portion of the connecting member 38 is protruded downward and is inserted into the power feeding terminal 33 of the power feeding socket 32 on the cover 30.

The conductive fixture 50 is formed by bending a metal plate and has U-shaped squeezers 50*a* and 50*b* on upper and lower ends and has a notch 50*c* behind the squeezer 50*b*. When the horizontal sector 48*a* of the power feeding pin 48 is inserted between the squeezers 50*b* through the notch 50*c*, the squeezer 50*b* squeezes the horizontal sector and is electrically connected to the power feeding pin 48. Middle portion of each of a pair of the conductive fixtures 50 is located within the grooves 46 and 46 on the socket main unit 37, and the squeezers 50*a* are inserted into the hollow insert 42 of the socket main unit 37 so that, when the relay socket 36 is mounted on the pilot valve 12, the squeezer 50*a* and the solenoid terminal 25 are electrically connected with each other. These components constitute the relay terminal 51.

In order to mount the cover 39 on the socket main unit 37, an engagement groove 47, designed to receive a ridge rim 39*a* on inner surface of the cover 39, is provided on each of left and right sides of of the socket main unit 37. Also, locking recesses 47*a*, where locking projections (not shown) of the cover 39 are engaged, are formed on both sides. A pressure member 53 having a notch is provided on upper surface of the cover 39. With the pressure member 53 positioned on the moving piece 43 of the socket main unit 37, the moving piece 43 can be operated by applying pressure to the pressure member 53 (FIG. 6).

When the relay socket 36 is pressed against the pilot valve 12, the insert 42 is inserted into the protective wall 26, and the squeezer 50*a* of the conductive fixture and the solenoid terminal 25 are electrically connected with each other. Further, the locking ridge 41 is engaged with the locking recess 12*b*, and locking member 43*a* of the moving piece 43 is engaged with the locking ridge 26*a* of the protective wall 26 and are mounted on the pilot valve 12 (FIG. 6).

On the other hand, when the relay socket 36 is pulled in reverse direction while pressing the pressure member 53 of the cover 39, engagement of the locking member 43*a* of the moving piece 43, pressed by the pressure member 53, with the locking ridge 26*a* is released, and the engagement of the locking ridge 41 with the locking recess 12*b* is also released by the pulling force, and the relay socket 36 can be separated from the pilot valve 12. In these cases, the relay socket 36 can be easily engaged to or removed from the pilot valve 12 because inclined sectors 41*a* are provided on front and rear surfaces of the locking ridge 41.

In the solenoid valve assembly with the above arrangement, in case power is supplied via the manifold base 1, the wiring box having the power feeding socket 32 is mounted on the manifold base 1, and the relay socket 36 is mounted on the pilot valve 12. When the solenoid valve 2 is installed on the manifold base 1 using mounting screws (not shown) under this condition, the vertical sector 48*b* of the power feeding pin 48 is inserted into the power feeding terminal 33 of the power feeding socket 32, and power can be supplied to the solenoid valve 2 via the manifold base 1 (FIG. 6), and each of the ports on the solenoid valve 2 is communicated with the corresponding opening on the manifold base 1, thus forming the channels as desired.

On the other hand, in case power is directly supplied to the solenoid, the solenoid valve 2, after removing the relay socket 36, may be mounted on the manifold base 1, after removing the wiring box 29 from it. In this case, by connecting the power feeding socket (not shown) connected to the power source to the solenoid terminal 25 of the solenoid valve 2, power can be directly supplied.

Therefore, it is possible to achieve direct power feeding to the solenoid valve 2 and also power feeding via the manifold base 1 using the manifold base 1 and the solenoid valve 2 for common use, and this leads to the reduction of the number of types of the manifold bases and the solenoid valves.

In the above, the solenoid valve 2 is designed as a 5-port valve, while the solenoid valve of the present invention is not limited to this.

Figure 7:
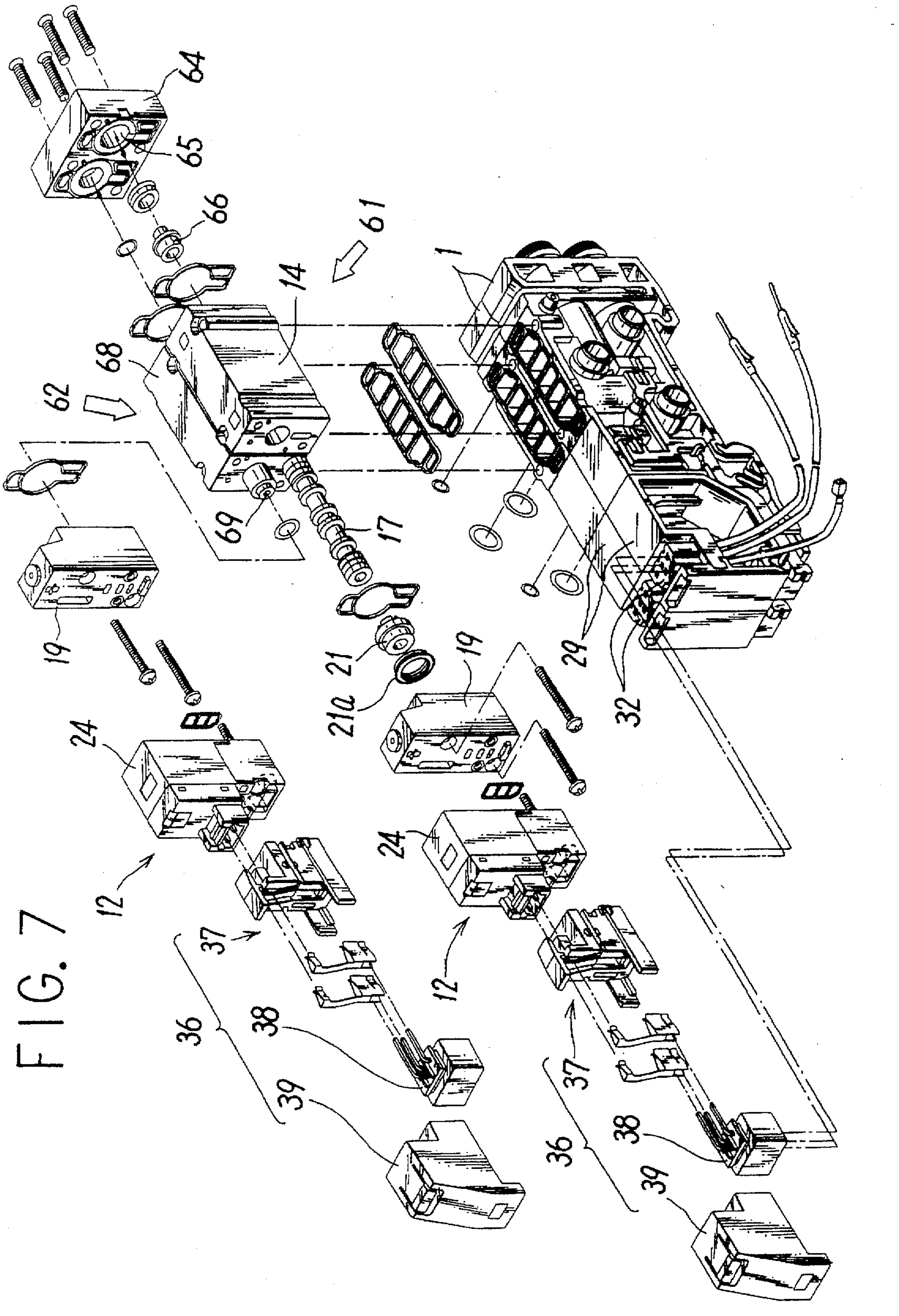
FIG. 7 is an exploded perspective view showing an arrangement of a second embodiment of the solenoid valve assembly provided with the power feeding system of the present invention.

FIG. 7 and FIG. 8 each represents a second embodiment of the present invention where a solenoid valve 60 is designed in double pilot type. The solenoid valve 60 of the second embodiment has the same arrangement as the first embodiment except that the solenoid valve is designed in double pilot type, and the same component is referred by the same symbol.

The double pilot type solenoid valve 60 of the second embodiment comprises two manifold bases 1 arranged in one set, and a solenoid valve 61 is installed on one of these manifold bases 1 and a solenoid dummy valve 62 is installed on the other.

Compared with the solenoid valve 2 of the first embodiment, the above solenoid valve 61 is in the same design in the cylinder chamber and the driving piston 21 of the piston box 19 mounted on one end surface in axial direction of the valve main unit 14, whereas, on the other end surface of the valve main body 14, an end plate 64 in common with the solenoid dummy valve 62 is used, and a return chamber having the same diameter as the cylinder chamber in the piston box 19 is provided on the end plate 64 and the return piston 66 having the same diameter as the above driving piston is slidably inserted.

On the other hand, the solenoid dummy valve 62 comprises a pilot valve 12 and a piston box 19 similar to those of the first embodiment, while a dummy main unit 68 is included instead of the valve main unit 14. The dummy main unit 68 has a pilot channel 69, which supplies and discharges pilot fluid, coming from the pilot valve 12 of the dummy valve 62, to and from a return chamber 65 of the solenoid valve 61. In this connection, on the connection with the dummy main unit 68 in the end plate 64, a channel 70 for communicating the end of the pilot channel 69 in the dummy main unit 68 with the return chamber 65 is provided.

The other arrangement of the second embodiment is the same as in the first embodiment, and the same component is referred by the same symbol in the figures, and detailed description is not given here.

In the solenoid valve assembly of the second embodiment, when the solenoid dummy valve 62 is installed on the manifold base 1, each opening of the manifold base 1 is closed by the dummy main unit 68. When the solenoid 24 of the solenoid valve 61 is excited, the valve disc 17 is moved toward the right in FIG. 8 by the driving force of the driving piston 21. When the solenoid of the dummy valve 62 is excited while releasing excitation of the solenoid 24, the pilot fluid is supplied to the return chamber 65 via the pilot channel 69 of the dummy main unit 68, and the valve disc 17 is moved as it slides in reverse direction.

Therefore, the double pilot type solenoid valve can be composed of the solenoid valve 61 and of the dummy valve 62 of approximately the same shape.

The other aspects of operation of the second embodiment is the same as those of the first embodiment, and detailed description is not given here.

What we claim are:

1. A power feeding system for a solenoid valve assembly, which comprises manifold bases, each having a plurality of openings on a mounting surface for supplying and discharging pressure fluid to and from a solenoid valve, and solenoid valves, each having a plurality of ports, each port arranged to be connected to one of said openings on the mounting surface of one of said manifold bases, said openings and said ports communicating with each other when said solenoid valve is installed on the manifold base, wherein:

a solenoid terminal for supplying power to the solenoid is provided on one end surface of the solenoid valve so that a socket for power feeding can be directly connected thereto;

a wiring box having a power feeding terminal connected to a power source, said wiring box being removably mounted on one end surface of a manifold base;

a relay socket having a conductive fixture to be electrically connected with the solenoid terminal;

power feeding pins for electrically connecting the conductive fixture to the power feeding terminal of the wiring box when the solenoid valve is installed on the manifold base;

said conductive fixture has a plurality of squeezers;

each power feeding pin is formed in an inverted L-shape and comprises a horizontal sector for insertion in one of said plurality of squeezers of said conductive fixture, and a vertical sector for electrical connection to the power feeding terminal of the wiring box; and the solenoid terminal protrudes from the solenoid and is inserted in other of said plurality of squeezers of the conductive fixture to connect electrically when the relay socket is mounted on the solenoid.

2. A power feeding system for a solenoid valve assembly according to claim 1, wherein said openings include a supply opening, a discharge opening and an output opening.

3. A power feeding system for a solenoid valve assembly according to claim 2, each manifold base further comprising:

a supply channel communicated with the supply opening and a discharge channel communicated with the discharge opening, and said channels on one manifold base are communicated with corresponding channels on another manifold base when the manifold bases are coupled together; and an output port communicated with the output opening is provided on one end surface of the manifold base opposite to the side where the wiring box is connected.

4. A power feeding system for a solenoid valve assembly according to one of claims 1 to 3, wherein:

the wiring box is removably mounted on one end surface of the manifold base by elastically engaging a pair of pawls on the wiring box with a pair of locking holes on the manifold base; and said wiring box has open sides and forms a passage for a lead wire.

* * * * *